United States Patent [19]

Hunter et al.

[11] Patent Number: 4,554,294

[45] Date of Patent: Nov. 19, 1985

[54] NITRO UREA BASED BLOWING AGENTS

[75] Inventors: Byron A. Hunter, Alpine, Utah; Donald G. Rowland; Warren J. Peascoe, both of Woodbridge, Conn.

[73] Assignee: Uniroyal, Inc., Middlebury, Conn.

[21] Appl. No.: 678,311

[22] Filed: Dec. 5, 1984

[51] Int. Cl.$^4$ ............................................. C08J 9/10
[52] U.S. Cl. .................................... 521/93; 252/350; 264/DIG. 5; 521/79; 521/92; 521/94; 521/95; 521/909
[58] Field of Search ................ 521/92, 93, 79, 94, 521/95, 909; 252/500; 264/DIG. 5

[56] References Cited

U.S. PATENT DOCUMENTS

| | | |
|---|---|---|
| 2,683,696 | 7/1954 | Muller et al. ............................ 521/95 |
| 3,111,496 | 11/1963 | Hunter ................................... 521/93 |
| 3,305,496 | 2/1967 | Riley, Jr. et al. ...................... 521/93 |
| 3,321,413 | 5/1967 | Riley, Jr. et al. ...................... 521/93 |
| 3,876,622 | 4/1975 | Motokawa et al. ................... 521/93 |
| 4,462,927 | 7/1984 | Hunter ................................... 521/93 |
| 4,472,536 | 9/1984 | Rowland et al. ...................... 521/93 |
| 4,482,650 | 11/1984 | Rowland et al. ...................... 521/93 |

OTHER PUBLICATIONS

"New Blowing Agents for Foaming Plastics", Reed, British Plastics, Oct., 1960, p. 53.

*Primary Examiner*—Morton Foelak
*Attorney, Agent, or Firm*—John A. Shedden

[57] ABSTRACT

The present invention relates to an improved nitro urea compound specifically the zinc salt of nitro urea useful as a blowing agent composition, its preparation and its use.

2 Claims, No Drawings

NITRO UREA BASED BLOWING AGENTS

The present invention relates to an improved nitro urea compound useful as a blowing agent composition, its preparation and its use.

When making an extended material such as a foamed polymeric material, the polymeric material has conventionally been mixed with a blowing agent such as azodicarbonamide. The performance requirements of blowing agents have now become more and more critical, and changes in the composition of blowing agents can have significant effects on the end product. The instant invention provides a new compound consisting of a zinc salt of nitro urea which can be used as part of the blowing agent composition useful for the expanding of gas expandable polymers such as polyethylene, polyvinylchloride, and natural and synthetic rubbers. The new compound is especially useful in the expansion of silicone elastomers.

The expanding of silicone rubbers, in the past, has been difficult to achieve with satisfactory results.

Methods for preparing nitro urea are well known in the prior art. U.S. Pat. No. 2,311,784, (Spaeth) describes such a method. However, there is no mention of a zinc salt of nitro urea.

Reed—New Blowing Agents for Foaming Plastics, *British Plastics*, Oct. 1960, teaches to use nitro urea as a blowing agent. However, no mention is made of the use of a zinc salt of nitro urea.

German Pat. No. 1109876 teaches certain nitro urea derivatives useful as blowing agents. The zinc salt of nitro urea is neither mentioned nor suggested in this patent.

The compositions of this invention find general use in foaming any gas expandable polymeric material, especially those which are capable of setting to a normally solid state and having sufficient consistency and strength at the processing temperature (or to be enabled by virtue of the confining device) to retain the gas and preserve a cellular structure in the expanded product. The processing temperature will depend upon a number of factors, including the nature of the polymeric material and its visco-elastic properties, upon the forming equipment being used and upon the nature of the end product desired. In general, for most effective results it is important that the polymeric material being expanded has consistency and tensile strength sufficient to retain the individual micropores of gas a discrete cells, preventing coalescence to an undesirable coarse cell structure. This may generally be attained in the case of thermosetting resins by adjustment of the rate and state of cure to give the composition the desired viscosity and strength at gas forming temperature. In the case of thermoplastic resins, the desired consistency and strength will generally be achieved by adjusting the temperature until the proper viscosity is obtained. The gas forming temperature will vary with the blowing agent composition selected and will be selected depending on the polymer to be expanded.

The thermosetting polymer materials which may be used are any type of rubber which is curable or vulcanizable to a solid state, exemplified by natural rubber or synthetic rubbery polymers made from diolefins such as butadiene or isoprene, or their copolymers with styrene, acrylonitrile, and the like; also, butyl rubber, polymerized halo-diolefins, such as neoprene, etc., as well as ethylene-propylene copolymers and ethylene-propylene-non-conjugated diene terpolymer elastomers and silicone rubbers. Thermoplastic polymers suitable for being expanded with the blowing agents of this invention included polyethylene, polypropylene, polystyrenes, poly(vinyl chloride), polyamides, poly(styreneacrylonitrile), polyacrylates and the like.

The blowing agent compositions are mechanically mixed with the polymeric materials and, if desired, other customary adjuvants, fillers, plasticizers, stabilizers, etc., may also be added, prior to heating the mixture to temperatures at which decomposition of the blowing agent takes place. The amount of the blowing agent composition in the polymer may vary from 0.05 to 20%, the quantity used depending upon the application and the density desired. Usually 0.1 to 15% concentrations of blowing agents suffice, and ordinarily 1.0 to 10% are employed.

In accordance with the invention, the new compound is prepared by a reaction of nitro urea with zinc oxide. Essentially stoichiometric amounts of zinc oxide and nitro urea are suspended in a suitable amount of water at room temperature. Stirring takes place for 30 minutes–4 hours, and normally an exothermic reaction is observed. The reaction product is then filtered from a suspension, washed with water and dried. Alternatively, the zinc oxide and the nitro urea are compounded in a polymer which is used as a blowing agent composition.

In a further embodiment of the invention, one may provide a mixture of azodicarbonamide with the aforesaid zinc salt of nitro urea or a mixture of nitro urea and zinc oxide. It has been found that the compound of the instant invention serves as an activator when used in a blowing agent composition containing azodicarbonamide.

Blowing agent compositions using the novel compounds of the invention are described in the examples below. The following examples are illustrative as to specific embodiments of the invention without limiting its scope:

EXAMPLE 1

Preparation of zinc salt of nitro urea (a) Preparation of urea nitrate

Into a 2000 ml 3-necked flask equipped with a mechanical stirrer and a thermometer was introduced 1500 ml glacial acetic acid.

The stirrer was turned on, and 112.5 g of urea was added all at once. When all the urea had dissolved, 180 cc of concentrated nitric acid was gradually added over a five minute period. Crystals formed almost immediately. Application of a water bath kept the temperature under 25° C. The mixture was allowed to stir overnight. The white crystalline product was filtered of a sintered glass funnel under suction, and the resulting filter cake was washed with several separate portions of benzene (total of 300 ml). The product was dried in air at room temperature. The yield of 218.6 g represents 94% of theory. The product melted at 159° C.

(b) Preparation of nitro urea

Into a 3000 ml 3-necked flask equipped with a mechanical stirrer, heating mantle and a thermometer was introduced 2000 g (1905 ml) of glacial acetic acid and 200 g of acetic anhydride. The mixture was stirred and heated 63° C. The heating mantle was removed, and 200 g of urea nitrate was added all at once. The temperature dropped to 58° C., but remained steady at 57°–58° C. as the mix was stirred for thirty minutes. During this period the solid suspensate gradually dissolved and finally formed a clear solution. Heat was momentarily applied (to 65° C.), and the heating mantle was removed. The mixture was allowed to stir and cool overnight. The mix was then cooled to 15° C. (ice water bath), and the crystalline product was filtered on a sintered glass funnel under suction. The product was washed with three 100 ml portions of benzene and then 100 ml of hexane. The material was removed to a drying paper and allowed to stand overnight. The yield of 136.3 g (about 80% of theory). mp: 144°–145° C.

(c) Preparation of zinc salt of (b)

To a 500 ml 3-necked, round bottom flask, equipped with a mechanical stirrer and a thermometer, were introduced 105 grams of nitro urea, 200 ml of water, and 40.7 grams ZnO at room temperature. The suspension was stirred for one hour; the temperature rose 24° C. to 30° C. The suspension was then filtered, and the precipitate was washed twice with cold water. The mixture was dried overnight in an oven at 60° C. The yield was 102 grams, and the decomposition temperature was determined to be 125° C.

EXAMPLE 2

The zinc salt of Example 1 as well as mixtures with azodicarbonamide were evaluated as blowing agents. Table I below sets forth the decomposition point and the gas evolution measured in a gas burette (all in parts by weight).

TABLE I

| Run No. | AZ | ZSN | Decomposition Point (°C.) | Gas Evolution cc/g |
|---|---|---|---|---|
| 1 | 1.0 | 0 | 218 | 205 |
| 2 | 0.9 | 0.1 | 122 | 161 |
| 3 | 0.5 | 0.5 | 124 | 180 |
| 4 | 0.35 | 0.65 | 125 | 195 |
| 5 | 0 | 1.0 | 122 | 204 |

REMARKS:
AZ is azodicarbonamide. ZSN is the zinc salt of nitro urea of the instant invention (Run No. 1 is outside the invention.)
From these data it appears that as little as 10% of ZSN will lower the decomposition temperature of azodicarbonamide from over 200° C. to 122° C.

EXAMPLE 3

The rate of gas evolution may be accelerated by the addition of certain compositions of this invention as illustrated in Table II.

TABLE II

| Run No. | AZ, g | Nitrourea, g | ZSN, g | ZnO, g | Gas cc/g | Evolution Time to 90% |
|---|---|---|---|---|---|---|
| 6 | 1.0 | — | — | — | Nil | — |
| 7 | 0.95 | 0.05 | — | — | 30 | 27 Min |
| 8 | 0.95 | — | 0.05 | — | 193 | 14 Min |
| 9 | 0.95 | 0.035 | — | 0.015 | 195 | 10 Min |

REMARKS:
Experiments were conducted at 155° C. It is apparent that not only in the decomposition temperature of azodicarbonamide reduced but also the gas evolution is considerably accelerated.

EXAMPLE 4

Certain blowing agent compositions of this invention were evaluated for the expansion of silicone rubber in the following manner:

Blowing agent and curatives were added to the elastomer on a mill set for about 38° C. After thorough mixing, the compounded stock was sheeted off to a thickness of 0.64 cm. Subsequently, the stock was press cured for 15 minutes at 150° C. and for 4 hours at 205° C., after which time and foamed silicone rubber was cooled to room temperature and tested. Recipes and results are disclosed in Table III (all in parts by weight):

TABLE III

| Run No. | 10 |
|---|---|
| Silicone Rubber | 100 |
| Curative - 1 | 1.2 |
| Curative - 2 | 2.5 |
| Nucleating Agent | 3.0 |
| ZSN | 2.0 |
| Density, lbs/ft$^3$ | 54.2 |
| Density, g/cm$^3$ | 0.87 |
| Density reduction, % | 19 |

REMARKS:
Curative - 1: 2,4 - dichlorobenzoyl peroxide
Curative - 2: dicumyl peroxide
Nucleating Agent: Diatomaceous earth

EXAMPLE 5

The zinc salt of nitrourea (ZSN) was used for the expansion of polyethylene by first dry-blending low density polyethylene with the blowing agent compositions and then extending such blends by means of a Brabender [trademark] extruder at 25 RPM and through a circular exit die (temperature: 190° C.; diameter: 0.64 cm). The ingredients and results are listed in Table IV.

TABLE IV

| Run No. | 11 | 12 | 13 |
|---|---|---|---|
| Polyethylene | 100 | 100 | 100 |
| Azodicarbonamide | — | 0.95 | 1.0 |
| ZSN | 1.0 | 0.05 | — |
| Foam density, g/cm$^3$ | 0.765 | 0.558 | 0.785 |

What is claimed is:

1. A gas expandable composition comprising a gas expandable polymer and an effective amount of the blowing agent composition selected from the group consisting of the zinc salt of nitro-urea and a mixture of azodicarbonamide and the zinc salt of nitro-urea.

2. The composition of claim 1 wherein said polymer is elastomeric or thermoplastic.

* * * * *